United States Patent
Wang et al.

(10) Patent No.: US 11,797,876 B1
(45) Date of Patent: Oct. 24, 2023

(54) UNIFIED OPTIMIZATION FOR CONVOLUTIONAL NEURAL NETWORK MODEL INFERENCE ON INTEGRATED GRAPHICS PROCESSING UNITS

(71) Applicant: Amazon Technologies, Inc., Seattle, WA (US)

(72) Inventors: Leyuan Wang, Davis, CA (US); Yida Wang, Palo Alto, CA (US); Mu Li, Union City, CA (US); Zhi Chen, Santa Clara, CA (US); Yizhi Liu, Fremont, CA (US); Yao Wang, Sunnyvale, CA (US)

(73) Assignee: Amazon Technologies, Inc, Seattle, WA (US)

( * ) Notice: Subject to any disclaimer, the term of this patent is extended or adjusted under 35 U.S.C. 154(b) by 1,155 days.

(21) Appl. No.: 16/453,489

(22) Filed: Jun. 26, 2019

(51) Int. Cl.
*G06N 20/00* (2019.01)
*G06T 7/10* (2017.01)
*G06T 1/20* (2006.01)
*G06F 9/455* (2018.01)
*G06N 3/082* (2023.01)
*G06F 8/41* (2018.01)
*G06F 18/24* (2023.01)

(52) U.S. Cl.
CPC .............. *G06N 20/00* (2019.01); *G06F 8/443* (2013.01); *G06F 8/447* (2013.01); *G06F 8/451* (2013.01); *G06F 9/45558* (2013.01); *G06F 18/24* (2023.01); *G06N 3/082* (2013.01); *G06T 1/20* (2013.01); *G06T 7/10* (2017.01); *G06F 2009/4557* (2013.01)

(58) Field of Classification Search
CPC ... G06N 20/00; G06T 7/10; G06F 8/447; G06F 8/451; G06F 9/45558; G06K 9/6267; G06N 3/082; G06F 2009/4557

USPC ............................... 717/140-157; 706/45-52
See application file for complete search history.

(56) References Cited

U.S. PATENT DOCUMENTS

| | | | | |
|---|---|---|---|---|
| 6,973,446 | B2* | 12/2005 | Mamitsuka et al. ... | G06N 5/025 706/50 |
| 7,052,277 | B2* | 5/2006 | Kellman .................. | G09B 7/00 434/323 |

(Continued)

OTHER PUBLICATIONS

"Amazon SageMaker Neo," downloaded Jul. 23, 2019 from https://docs.aws.amazon.com/sagemaker/latest/dg/neo.html, 2 pages.
"Compile a Model (Console)," downloaded Jul. 23, 2019 from https://docs.aws.amazon.com/sagemaker/latest/dg/neo-ob-compilation-console.html, 4 pages.
"Compute Library for Deep Neural Networks (CLDNN)," https://01.org/cldnn downloaded Jul. 23, 2019, 2 pages.

(Continued)

*Primary Examiner* — Anil Khatri
(74) *Attorney, Agent, or Firm* — NICHOLSON DE VOS WEBSTER & ELLIOTT, LLP

(57) ABSTRACT

Techniques for optimizing and deploying convolutional neural network (CNN) machine learning models for inference using integrated graphics processing units are described. A model compilation system optimizes CNN models using optimized vision-specific operators as well as both graph-level tuning and tensor-level tuning to explore the optimization space for achieving heightened performance. The model compilation system may also implement a heuristic-based two-stage technique for falling back certain operators of CNN models to use CPUs when needed or otherwise beneficial.

20 Claims, 10 Drawing Sheets

(56) References Cited

U.S. PATENT DOCUMENTS

| | | | |
|---|---|---|---|
| 7,222,127 B1* | 5/2007 | Bem et al. | G06F 16/24578 707/999.102 |
| 7,925,984 B2* | 4/2011 | Awe et al. | H04L 41/0806 715/764 |
| 8,655,260 B2* | 2/2014 | Yueh et al. | G09B 7/02 434/350 |
| 9,786,036 B2* | 10/2017 | Annapureddy | G06V 30/194 |
| 10,402,731 B1* | 9/2019 | Cosic | A63F 13/55 |
| 10,607,134 B1* | 3/2020 | Cosic | G06N 3/084 |
| 10,922,583 B2* | 2/2021 | Kaehler et al. | G06V 20/10 |
| 11,055,566 B1* | 7/2021 | Pham et al. | G06N 3/045 |
| 11,386,346 B2* | 7/2022 | Xue et al. | G06N 7/01 |
| 11,556,778 B2* | 1/2023 | Dey et al. | G06N 3/082 |
| 11,562,591 B2* | 1/2023 | Nguyen et al. | G06V 30/413 |
| 11,568,617 B2* | 1/2023 | Sung et al. | G06T 19/006 |
| 11,568,976 B1* | 1/2023 | Rockne et al. | G16H 50/20 |
| 2019/0025773 A1* | 1/2019 | Yang et al. | G06K 9/6256 |
| 2019/0205737 A1* | 7/2019 | Bleiweiss et al. | G06N 20/00 |

OTHER PUBLICATIONS

"Figure 6: Segmented sort example," NVIDIA Developer Blog, downloaded Jul. 23, 2019 from https://devblogs.nvidia.com/cutting-edge-parallel-algorithms-research-cuda/image01/, 1 page.

Albawi et al, "Understanding of a Convolutional Neural Network", IEEE, pp 1-6 (Year: 2017).*

Andola, Forrest N. et al.; "SqueezeNet: AlexNet-Level Accuracy with 50x Fewer Parameters and <0.5MB Model Size," Nov. 4, 2016, https://arxiv.org/pdf/1602.07360.pdf, 13 pages.

Anglada, Marti et al.; "Early Visibility Resolution for Removing Ineffectual Computations in the Graphics Pipeline," IEEE International Symposium on High Performance Computer Architecture, 12 pages.

Arm Compute Library, https://www.arm.com/why-arm/technologies/compute-library, downloaded Jul. 23, 2019, 8 pages.

Azarkhish, Erfan et al.; "Neurostream: Scalable and Energy Efficient Deep Learning with Smart Memory Cubes," IEEE Transactions on Parallell and Distributed Systems, Sep. 24, 2017, https://arxiv.org/abs/1701.06420, 15 pages.

Baxter, Sean; "Moderngpu: Patterns and Behaviors for GPU Computing," http://moderngpu.github.io/moderngpu, downloaded on Jul. 23, 2019, 4 pages.

Cayir et al, "Feature Extraction Based on Deep Learning for Some Traditional Machine Learning Method", IEEE, pp 1-4 (Year: 2018).*

Chen, Tianqi et al; "Learning to Optimize Tensor Programs," Neural Information Processing Systems 2018, downloaded from https://papers.nips.cc/paper/7599-learning-to-optimize-tensor-programs.pdf on Jul. 23, 2019, 12 pages.

Chen, Tianqi, et al.; "TVM: An Automated End-to-End Optimizing Compiler for Deep Learning," Oct. 5, 2018, https://arxiv.org/abs/1802.04799v3, 16 pages.

Chetlur, Sharan et al; "cuDNN: Efficient Primitives for Deep Learning," Dec. 18, 2014, https://arxiv.org/pdf/1410.0759.pdf, 9 pages.

Cheung "Convolutional Neural Networks Applied to Human Face Classification", IEEE, pp 580-583 (Year: 2012).*

Deuermeyer, Deanne et al.; "Release Notes for Intel Distribution of OpenVINO Toolkit 2019," https://software.intel.com/en-us/articles/OpenVINO-RelNotes downloaded Jul. 23, 2019, 20 pages.

Gama et al, "Convolutional Neural Network Architectures for Signals Supported on Graphs", IEEE, pp 1034-1049 (Year: 2019).*

Gong, Zhangxiaowen et al.; "An Empirical Study of the Effect of Source-Level Loop Transformations on Compiler Stability," Proc. ACM Program Lang., Vol. 2, Nov. 2018, downloaded from https://iacoma.cs.uiuc.edu/iacoma-papers/oopsla18.pdf on Jul. 23, 2019, 30 pages.

Grasso, Ivan et al.; "Energy Efficient HPC on Embedded SoCs: Optimization Techniques for Mali GPU," IEEE, 2014, downloaded from http://www.petarradojkovic.com/publications/IPDPS-2014_Grasso.pdfon Jul. 23, 2019, 10 pages.

Han, Song et al; "Deep Compression: Compressing Deep Neural Networks with Pruning, Trained Quantization and Huffman Coding," ICLR 2016, https://arxiv.org/pdf/1510.00149.pdf, 14 pages.

Harris, Mark et al.; "Chapter 39: Parallel Prefix Sum (Scan) with CUDA," NVIDIA Developer, https://developer.nvidia.com/gpugems/GPUGems3/gpugems3_ch39.html, downloaded on Jul. 23, 2019, 24 pages.

He, Kaiming et al; "Deep Residual Learning for Image Recognition," Dec. 10, 2015, https://arxiv.org/pdf/1512.03385.pdf, 12 pages.

Hillis, W. Daniel and Guy L. Steele, Jr.; "Data Parallel Algorithms," Communications of the ACM, Dec. 1986, Vol. 29, No. 12, 14 pages.

Hou, Kaixi et al.; "Fast Segmented Sort on GPUs," International Conference on Supercomputing, ICS '17, Jun. 2017, 10 pages.

Howard, Andrew G. et al.; "MobileNets: Efficient Convolutional Neural Networks for Mobile Vision Applications," Apr. 17, 2017, https://arxiv.org/pdf/1704.04861.pdf, 9 pages.

Howes, Lee and Aaftab Munshi; "The OpenCL Specification," Version 2.0, Document Revision 29, Jul. 21, 2015, https://www.khronos.org/registry/OpenCL/specs/opencl-2.0.pdf, 288 pages.

Huynh, Loc N. et al.; "DeepMon: Mobile GPU-based Deep Learning Framework for Continuous Vision Applications," Proceedings of the International Conference on Mobile Systems, Applications and Services, ACM, 2017, 14 pages.

Jmour et al, "Convolutional Neural Networks for image classification", IEEE, pp 397-402 (Year: 2018).*

Karimi, Kamran et al.; "A Performance Comparison of CUDA and Open CL," 2010, https://arxiv.org/ftp/arxiv/papers/1005/1005.2581.pdf, 10 pages.

Kayiran, Onur et al; "Managing GPU Concurrency in Heterogeneous Architectures," 47th Annual IEEE/ACM International Symposium on Microarchitecture, 2014, 13 pages.

Lane, Nicholas D. et al.; "DeepX: A Software Accelerator for Low-Power Deep Learning Inference on Mobile Devices," Proceedings of the 15th International Conference on Information Processing and Sensor Networks, 2016, 12 pages.

Liu, Jiawen et al.; "Processing-in-Memory for Energy-efficient Neural Network Training: A Heterogeneous Approach," 51st Annual IEEE/ACM International Symposium on Microarchitecture (Micro), 2018, 14 pages.

Liu, Wei et al.; "SSD: Single Shot Multibox Detector," Dec. 29, 2016, https://arxiv.org/pdf/1512.02325.pdf, 17 pages.

Liu, Yizhi et al.; "Optimizing CNN Model Inference on CPUs," Jan. 11, 2019, https://arxiv.org/abs/1809.02697, 16 pages.

McDanel, Bradley et al; "Embedded Binarized Neural Networks," Sep. 6, 2017, https://arxiv.org/pdf/1709.02260.pdf, 6 pages.

Merrill, Duane; "CUB: Flexible library of cooperative threadblock primitives and other utilities for CUDA kernel programming, https://nvlabs.github.io/cub/ downloaded on Jul. 23, 2019, 9 pages.

Nemire, Brad; "Cutting Edge Parallel Algorithms Research with CUDA," NVIDIA Developer Blog, downloaded Jul. 23, 2019 from https://devblogs.nvidia.com/cutting-edge-parallel-algorithms-research-cuda/, 9 pages.

NVIDIA Corporation. NVIDIA CUDA C programming guide. PG-02829-001_v6.5, Aug. 2014.

NVIDIA TensorRT, https://developer.nvidia.com/tensorrt, downloaded on Jul. 24, 2019, 10 pages.

Owens, John D. et al.; "GPU Computing," IEEE Vol 96, No. 5, May 2008, 21 pages.

Philipp et al, "Analysis of Control Flow Graphs Using Graph Convolutional Neural Networks", IEEE, pp 73-77 (Year: 2019).*

PREUßER, Thomas B. et al.; "Inference of Quantized Neural Networks on Heterogeneous All-Programmable Devices," Jun. 2, 2018, https://arxiv.org/pdf/1806.08085.pdf, 6 pages.

Pu, Jing et al.; "Programming Heterogeneous Systems from an Image Processing DSL," Oct. 28, 2016, https://arxiv.org/pdf/1610.09405.pdf, 12 pages.

Ragan-Kelley, Jonathan et al; "Halide: A Language and Compiler for Optimizing Parallelism Locality, and Recomputation in Image Processing Pipelines," ACM Sig Plan Notices, 2013, 12 pages.

(56) References Cited

OTHER PUBLICATIONS

Redmon, Joseph and Ali Farhadi; "YOLOv3: An Incremental Improvement," Apr. 8, 2018, https://arxiv.org/pdf/1804.02767.pdf, 6 pages.
Sengupta, Shubhabrata et al.; "Scan Primitives for GPU Computing," ACM Inc, Graphics Hardware, 2007, 11 pages.
Shi et al, "A Simplifying Method Of Vision Attention Simulating Human Vision In Machine Vision System", IEEE, pp 3097-3100 (Year: 2010).*
Tan, Mingxing et al.; "MnasNet: Platform-Aware Neural Architecture Search for Mobile," May 29, 2019, https://arxiv.org/pdf/1807.11626.pdf, 9 pages.
Wang, Leyuan et al; "Fast Parallel Skew and Prefix-Doubling Suffix Array Construction on the GPU," Concurrency and Computation: Practice and Experience, 2015, 20 pages.
Wu, Carole-Jean et al: "Machine Learning at Facebook: Understanding Inference at the Edge," 2019 IEEE International Symposium on High Performance Computer Architecture (HPCA), 14 pages.
Zhang, Xiangyu et al.; "ShuffleNet: An Extremely Efficient Convolutional Neural Network for Mobile Devices," Dec. 7, 2017, https://arxiv.org/pdf/1707.01083.pdf, 9 pages.

* cited by examiner

UNIFIED OPTIMIZATION FOR CONVOLUTIONAL NEURAL NETWORK MODEL INFERENCE ON INTEGRATED GRAPHICS PROCESSING UNITS

BACKGROUND

The recent advance of deep learning enables a number of sophisticated applications taking place at the edge, making the prevailing edge devices, such as cameras, speakers, televisions, mobile phones, around us "smart." These applications, which perform functions ranging from computer vision related tasks — such as image classification, object detection, and segmentation — to speech recognition and voice detection, typically leverage pre-trained deep learning models to perform inference using input data captured by the device. Although many edge devices send the input data to a remote server to perform the inference, it is becoming more and more desirable to execute the model inference directly at the edge devices for shorter latency, less burden of the network bandwidth, and better privacy protection to the users. However, this remains extremely difficult in practice, especially due to the difficulty in terms of programming.

BRIEF DESCRIPTION OF DRAWINGS

Various embodiments in accordance with the present disclosure will be described with reference to the drawings, in which.

DETAILED DESCRIPTION

Figure 1:
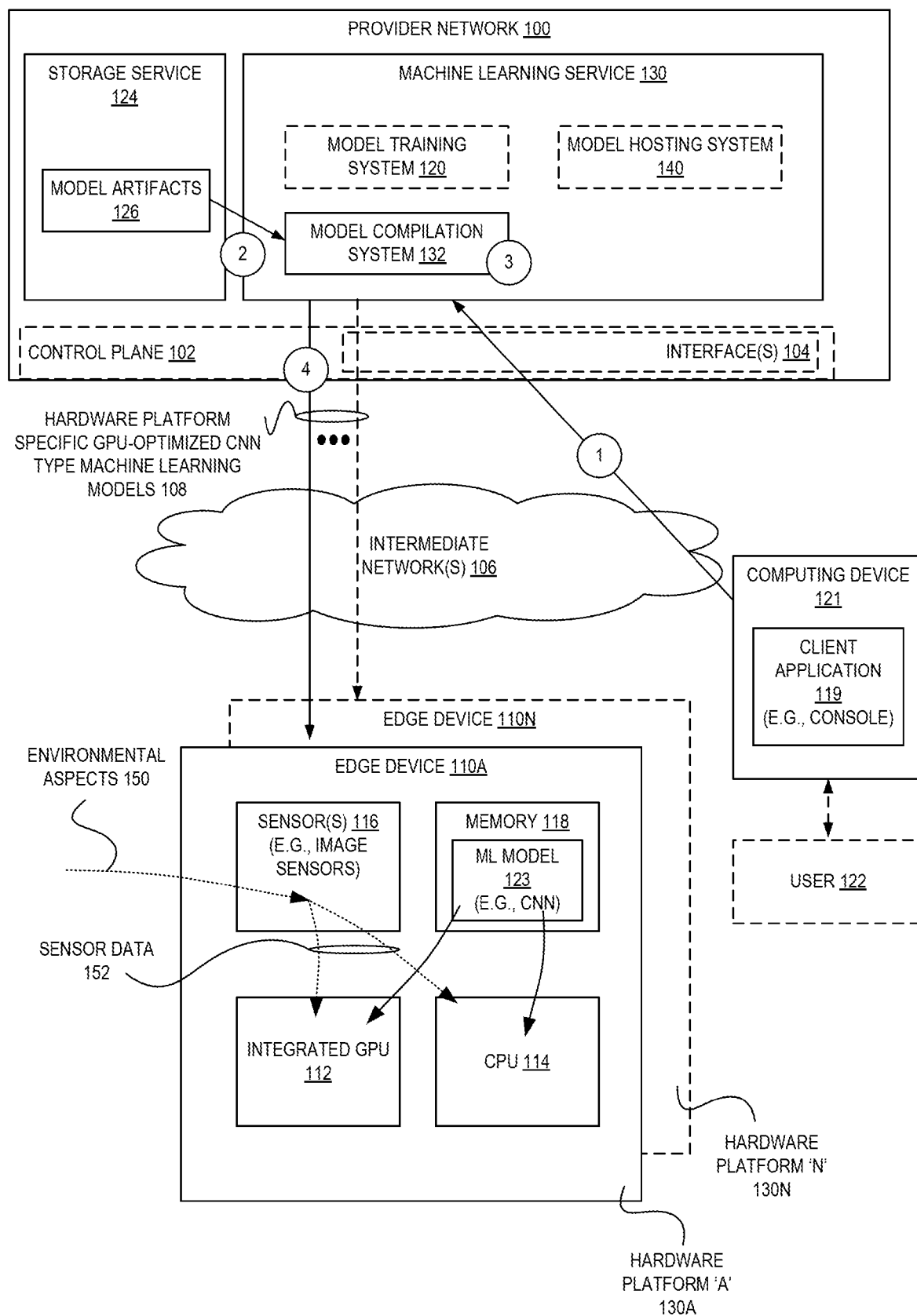
FIG. 1 is a diagram illustrating an environment for optimizing and deploying convolutional neural network models for inference using integrated graphics processing units according to some embodiments.

The present disclosure relates to methods, apparatus, systems, and non-transitory computer-readable storage media for unified optimization for convolutional model inference on integrated graphics processing units. In some embodiments, convolutional neural network (CNN) type machine learning models can be optimized to run on integrated graphics processing units (GPUs) of potentially multiple types of hardware platforms using an end-to-end system. The system can be incorporated into machine learning services to easily extend the supported hardware platform coverage and model coverage of its services.

Modern deep learning applications seek to execute model inference at edge devices for a variety of reasons, such as achieving shorter latency, relieving the burden of needing network connectivity to another network that would execute the inference, and protecting user privacy.

For example, running deep models within edge devices (e.g., smart cameras, mobile devices, smart speakers, toys, etc.) can have the potential to allow inferences to be generated quicker (e.g., on a same device that obtains the data upon which the inference is generated, instead of remotely - such as in a cloud network or other centralized location) and enable faster reactions to these inferences to occur.

However, the hardware resources available to generate inferences (e.g., processing units such as central processing units (CPUs), GPUs, tensor processing units (TPUs), field programmable gate arrays (FGPAs), etc., the amounts and types of available memory, etc.) and the architectures of these hardware resources (e.g., instruction set architectures (ISAs) such as x86, ARM, MIPS, SPARC) and/or supported libraries vary significantly from one edge device to another. Particularly, in many cases the set of hardware resources offered by an edge device may be severely constrained due to a need to be low-powered and/or inexpensive, which creates a difficulty in being able to run sophisticated or large ML models. Further, new ML models are continually being developed that often rely on new types of operations or libraries, which may or may not be natively supported by a particular hardware platform (or its associated frameworks), even further reducing the ability of typical edge devices to make practical use of these models.

CNNs are one of the most widely used model families in modern applications. For example, some popular CNN-based models are used for image classification (ResNet, MobileNet, SqueezeNet, etc.) to object detection (SSD, Yolo), etc. Given the high computational complexity of CNN models, it would be beneficial to execute them using the integrated GPUs that may exist at these edge devices, which are relatively ubiquitous and have more power and better energy efficiency than the accompanying CPUs. However, programming on integrated GPUs efficiently is challenging due to the variety of their architectures and programming interfaces.

Embodiments disclosed herein provide an end-to-end solution to execute CNN model inference on the integrated GPUs at the edge that uses a unified intermediate reorientation (IR) of machine learning models to represent and optimize vision-specific operators on integrated GPUs from multiple vendors. Embodiments also leverage machine learning-based scheduling search schemes to optimize computationally intensive operators, such as convolution. Embodiments can also utilize a fallback mechanism for operators not suitable or convenient to run on GPUs to easily shift their execution back to CPUs or other processing units. Compared to state-of-the-art solutions backed up by the vendor-provided high-performance libraries on popular GPUs, embodiments disclosed herein can achieve better performance on a number of popular image classification and object detection models. Embodiments may also provide wider model coverage and be more flexible to embrace new models than such existing approaches.

FIG. 1 is a diagram illustrating an environment for optimizing and deploying convolutional neural network models for inference using integrated graphics processing units according to some embodiments. FIG. 1 illustrates a model compilation system 132 that may generate an optimized CNN type machine learning model for execution by one or more edge devices 110A-110N.

A typical edge device 110 is implemented using a System on a Chip (SoC), which integrates various compute units such as CPU 114, GPU 114, and optionally a Digital System Processor (DSP) and/or Neural Processing Unit (NPU). The integrated GPUs 112, although normally much less powerful than server-side discrete GPUs, typically are able to deliver higher floating-point operations per second (FLOPs) than the accompanying CPUs 114. In practice, the majority of model inference at the edge is executed on CPUs 114 because of easier programmability and more flexible portability across different SoCs.

However, it is far less favorable to execute deep learning model inferences on CPUs at the edge due to two significant reasons. First, the CPU is normally less powerful than the integrated GPU located in the same SoC. For example, in three common edge device platforms, the theoretical peak FLOPs of GPUs are about 5, 6, and 2.5 times greater than the accompanying CPUs, respectively. In addition, CPUs may suffer from power throttling when overheated, leading to dramatically reduced performance. Moreover, the execution time on CPUs is less stable compared to that of GPUs. Besides possible power throttling, the operating system of the device normally has multiple processes (e.g., daemons) periodically running on CPUs, which inevitably causes CPU resource contention and consequently high variance of the model inference duration.

In practice, integrated GPUs observe limited usage in deep learning model inference due to the lack of a generic solution enabling their use. The integrated GPUs in different SoCs from different chip vendors vary vastly. For example, there is a wide disparity between Intel (R) Graphics and ARM (R) Mali GPUs in terms of architecture. Intel Graphics has a subgroup concept when organizing the threads. The running threads within the same subgroup share the same register file. Thus, sharing data within a subgroup could boost the performance on Intel Graphics significantly. However, the subgroup concept is not present in ARM Mali GPUs, hence the optimization customized for Intel Graphics is not applicable to devices equipped with ARM Mali GPUs. In addition, different GPUs may require different software drivers and programming languages, such as CUDA on Nvidia (R) products and OpenCL on Intel and ARM products. Thus, it is difficult for developers to transfer the optimization solutions from one hardware platform to another, let alone guaranteeing reasonable performance.

In order to provide GPU support, practitioners typically leverage the chip vendor provided high-performance libraries, e.g., Intel clDNN, ARM Compute Library (ACL), or Nvidia cuDNN, along with some deep learning frameworks or vendor-provided inference-only pipelines (e.g., Intel OpenVINO, Nvidia TensorRT), to build their applications. While such solutions are likely to deliver reasonable performance, this path is known to be inflexible and error-prone, and requires a large amount of tedious engineering efforts. Furthermore, these libraries focus heavily on computationally intensive operators like convolution, while leaving many vision-specific operators to run on CPU (e.g., Non Maximum Suppression (NMS)) or on GPU with suboptimal performance (e.g., ROIAlign). The vision-specific operators normally require much less computation than convolution, but they involve non-straightforward control logic which is not in the GPU-favored computation style. In addition, the input length of these operators could be notably greater than the number of processors of the GPU, and hence synchronizations is needed. Meanwhile, binding the applications to the third-party libraries greatly delays software development cycles. For example, developers have to wait for the vendor libraries to support the new features for deploying new models into production when new deep learning models are developed and new operators are introduced. Thus, many start-of-the-art CNN models lack off-the-shelf optimized implementation from vendor libraries.

To surmount these limitations, embodiments provide a unified end-to-end stack to deploy and optimize CNN models for efficient inference on mainstream integrated GPUs. However, embodiments are not limited only to edge GPUs, but can also be used in more traditional server-centric environments. Optimizing CNN models is significantly important as they are heavily used in image and video processing tasks which represent the primary use cases at edge devices. In some embodiments, the disclosed system runs efficiently on the aforementioned integrated GPUs, achieving similar, or even better performance compared to the vendor-provided solutions on various state-of-the-art image classification and object detection model families. In addition, the disclosed system has wider model coverage.

In some embodiments, the disclosed model compilation system 132 can be provided as part of a machine learning service 130 of a provider network 100, enabling model developers to optimize for inference at the edge. Using such a service 130, application developers can deploy CNN models optimized for inference in production on one or many types of edge devices. In some embodiments, the machine learning service 130 may also provide other machine learning related tasks, e.g., model training via a model training system 120, model hosting via a model hosting system 140, and the like.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code - typically without the user having any control of or knowledge of the underlying compute instance(s) involved.

As shown at circle (1), a user 122 may utilize a client application 119 executed by a computing device 121 to interact with the machine learning service 130, e.g., via use of client application 119 such as a browser displaying a website, a special-purpose application, or the like. For example, the user 122 may navigate a web-based console client application 119 to request that a particular machine learning model is compiled and/or deployed to one or more edge devices 110A-110N. This request may be issued as one or multiple commands sent using one or more messages such as HTTP request messages transmitted to an endpoint associated with the machine learning service 130 or the provider network 100.

For example, the user 122 may use a user interface of the client application 119 allowing the user to provide details regarding a compilation job. The user 122 may provide information such as a compilation job name, an account role having sufficient permissions for accessing certain needed resources (e.g., a storage location of a storage service 124 storing model artifacts 126 of the involved ML model), an identifier of the location of the stored model artifacts 126 (e.g., a path or URI), an identifier of the shape of the data matrix (e.g., {"input": [1,224,224, 3]}), an identifier of a machine learning framework that the model was trained in (e.g., "TensorFlow" or "MXNet"), etc. The user 122 may also provide an identifier of a storage location where the compiled model is to be stored, and/or identifiers of one or more edge devices (e.g., an identifier of a group of devices, or identifiers of individual devices) and optionally an identifier of each hardware platform type of the one or more edge devices. Upon receipt of this information, the model compilation system 132 may obtain the model artifacts 126 (e.g., model architectural definition, model weights, etc.) using the storage location identifier at circle (2) and perform the compilation with optimization process disclosed herein at circle (3). Thereafter, the model compilation system 132 may cause the compiled model(s) to be deployed to the edge device(s) 110A-110N at circle (4) and/or optionally stored to a same or different storage location provided by the storage service 124. The edge device(s) 110A-110N may store the model as model 123 in a memory 118, which may be executed in whole or in part by the GPU 112 and/or CPU 114 as disclosed herein. Thus, for example, the edge devices 110A-110N may generate sensor data 152 via sensing environmental aspects 150 via a sensor 116 (e.g., an image sensor capturing optical data such as a picture of a particular environment, a microphone capturing audio data such as a vocal command issued by a person in a nearby environment, etc.) and run inference with this sensor data 152 using the GPU 112 and/or CPU 114 to execute some or all of a ML model 123.

As introduced earlier, the integrated GPUs 112 may be mainstream integrated GPUs, such as those produced by Intel(R), ARM(R), Nvidia(R), etc. These GPUs are on-die connecting to other agents within the same SoC such as CPU cores via a ring interconnect, and these GPUs commonly share the main memory with CPU cores. The integrated GPUs maintain several levels of hierarchical caches to reduce data latency, typically including register files and L1 and L2 caches. An efficient computation pattern will mostly use the data stored in the register files and hide the latency to retrieve data from farther memories.

The integrated GPUs process the computation using their compute units, which are called execution units (EUs) in Intel graphics, shader cores (SCs) in ARM Mali GPUs, and stream multiprocessors (SMs) in Nvidia GPUs. Each compute unit coordinates a certain number of hardware threads and each thread owns a certain amount of register files. According to the generation and the level of the integrated GPU, the number of compute units varies. Most of the modern integrated GPUs support Single Instruction Multiple Data (SIMD) instructions. An efficient computation pattern should keep all the available threads of all compute units busy for most of the time and utilize the SIMD instructions whenever possible.

Today, integrated GPUs target two similar programming models for general-purpose programmability, OpenCL and CUDA. Integrated GPUs on Intel and ARM devices normally support OpenCL as the driver and utilize its APIs to program, which is the most general-purpose program to run on these GPUs. On the other hand, Nvidia products run CUDA as its proprietary driver.

Despite significant differences in their details, OpenCL and CUDA share many similar abstractions. The modern integrated GPU is a massively parallel processor that supports hundreds of hardware scheduled threads running simultaneously. These threads are organized into blocks (OpenCL: workgroups) and the hardware schedules blocks of threads onto hardware cores (CUDA: streaming multiprocessors, OpenCL: compute units). Nvidia GPUs have on the order of 16 cores, each of which includes 32-wide SIMD processors (CUDA: CUDA cores, OpenCL: SIMD units) that run 32 threads in lockstep. GPUs also feature a memory hierarchy of per-thread registers, per-block shared memory (per-work-group local memory), and off-chip global DRAM accessible to all threads. CUDA programs (or "kernels") specify the number of blocks and threads per block under a SIMT (single-instruction, multiple-thread) programming model. GPU implementations typically launch a number of kernels during execution. A kernel is essentially a function, which can be instantiated into many instances to deal with different data specified by block indices. They achieve parallelization by running many kernel instances simultaneously, each of which is called a work item. In integrated GPUs, a work item corresponds to a SIMD entry, processed by a CUDA core (CUDA term) or a virtual thread (OpenCL term in Intel Graphics). Therefore, a warp (CUDA term) or hardware thread (OpenCL term in Intel Graphics) processes multiple work items at the same time, inherently implementing the SIMD vectorization. This programming model of CUDA and OpenCL is suitable for the compute pattern of neural networks. Efficient GPU programs should have enough work per kernel to keep all hardware cores busy (load balancing), strive to reduce thread divergence (when neighboring threads branch in different directions), aim to access memory in large contiguous chunks to maximize achieved memory bandwidth (coalescing), and minimize communication between CPU and GPU. Designing an implementation that achieves all of these goals is a significant challenge.

As introduced earlier herein, in order to utilize integrated GPUs well, chip vendors normally ship products with well-optimized high-performance libraries, e.g., clDNN for Intel graphics, ACL for ARM Mali GPUs, and cuDNN for Nvidia GPUs. These libraries take advantage of properties of CUDA/OpenCL described above to achieve good performance on GPUs. In addition, Intel extends the OpenCL driver to support some special features of their hardware platforms. For instance, the Intel extended OpenCL organizes the work items of the same hardware thread as a subgroup, which share the same register files of the hardware threads. These high-performance libraries target mostly on optimizing the computationally intensive tensor operators like convolution.

In order to efficiently execute the entire model inference workloads, Nvidia and Intel wrap their high-performance libraries as TensorRT and OpenVINO, respectively. However, neither TensorRT nor Open VINO is open-sourced, making it inflexible for developers customize them for new or slightly changed models.

As of late, more and more applications at edge devices include image and video processing tasks, such as image classification, object detection, and segmentation. As discussed herein, these tasks are typically done via CNN model inference, which would preferably be executed on the integrated GPUs at the edge devices.

However, it is challenging to efficiently fulfill this task due to two reasons. First, CNN models consist of a large number of computationally intensive convolution operations. Fully optimizing them for integrated GPUs is non-trivial. On one hand, the architecture of the integrated GPUs varies vastly between vendors; that is, the optimized solution on one GPU may not be applicable to others at all. On the other hand, convolutions with different data input shapes may require different optimization schemes. There is no panacea to all possible convolution workloads. Therefore, the optimization on convolutions should be conducted case by case.

Second, there are some vision-specific operators in object detection and segmentation models, such as NMS and ROIAlign. These operators typically do not require intensive computation but require control-flow logic that GPUs are not naturally suitable to handle. For example, SSD yields a large number of predictions to achieve more coverage of location, scale, and aspect ratios. The NMS operator then scans these predictions to remove duplicates that point to the same object and finally sorts the updated predictions by confidence scores. For this type of operator, normally there is no high-performance implementation, or even no implementation on the integrated GPUs. This severely blocks the deployment of the corresponding models for efficient execution.

Embodiments disclosed herein optimize CNN models for integrated GPUs via the model compilation system 132 extending a deep learning compiler stack known to those of skill in the art, such as the TVM project, which compiles and optimizes deep learning model inference across multiple hardware platforms including CPUs, GPUs, and specialized accelerators. The deep learning compiler stack may utilize a unified intermediate representation (IR) of a model to lower the optimization schemes of different integrated GPUs to CUDA or OpenCL for code generation on those devices.

Currently, existing deep learning compiler stacks do not fully-support commonly used CNN models, e.g. SSD and Yolo, due to these stacks not supporting many vision-specific operators. And, even for those models whose operators are covered by deep learning compiler stacks, the end-to-end performance of CNN model inference on the mainstream integrated GPUs is generally not appealing because the control logic-involved operators are not carefully tuned for GPUs, and the scheduling schemes for computationally intensive tensor operators are not thoroughly explored.

Embodiments thus extend a deep learning compiler stack in multiple ways. For the vision-specific operators that require non-straightforward control flow logic, embodiments implement them via a unified IR in an optimized fashion, which thoroughly utilizes the available computing resources of the GPU and is applicable to integrated GPUs provided by different vendors. For the computationally intensive operators like convolution, embodiments apply a machine learning-based approach known to those of skill in the art in a new way to automatically search for good optimization schemes for different convolution workloads on different GPUs. In addition, to facilitate operators to fall back to CPUs for easier execution, embodiments extend the deep learning compiler stack to enable heterogeneous execution.

In some embodiments, the model compilation system 132 obtains high performance and wide model coverage using a unified optimization approach, in which vision-specific operators are optimized for integrated GPUs (which is non-trivial and ignored in existing systems), nonoptimized operators that are not GPU-friendly are fallen back to CPUs if needed, and/or two types of machine learning-based techniques are implemented to explore the optimization space for achieving better performance.

Figure 2:
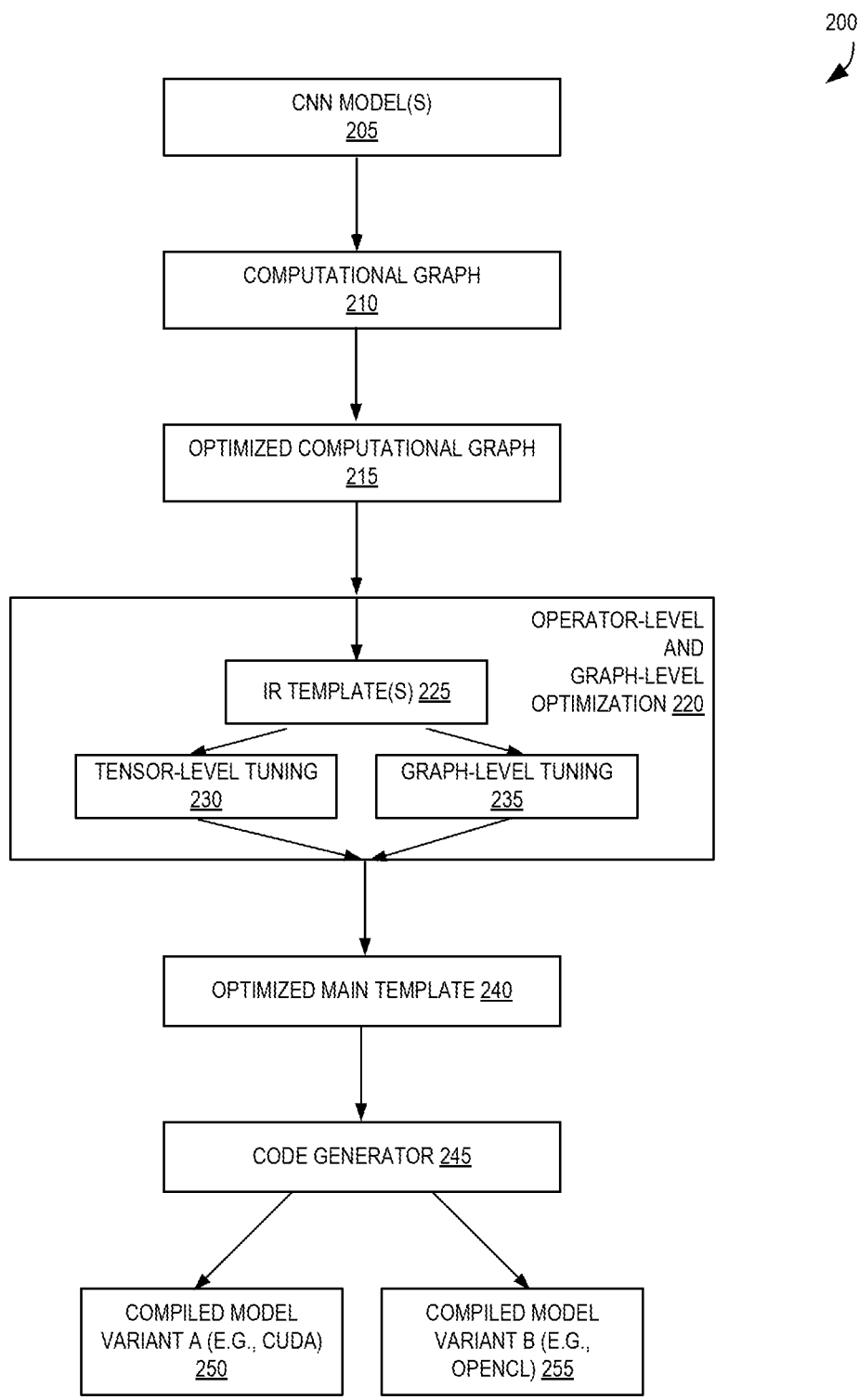
FIG. 2 is a diagram illustrating operations for optimizing convolutional neural network models for inference using integrated graphics processing units according to some embodiments.

An overview of operations 200 the compilation and optimization pipeline according to some embodiments is shown in FIG. 2, which may be executed by the model compilation system 132 of FIG. 1. A CNN model 205 is obtained (e.g., model artifacts from a storage service) and used to build a computational graph 210 using techniques known to those of skill in the art, in which the nodes of the graph correspond to operators to be performed. Optionally, the computational graph 210 may be optimized via a first pass using known general ML model optimization techniques, e.g., by a deep learning compiler stack.

In some embodiments, a set of operator-level and graph-level optimizations 220 are applied. For example, a set of GPU-optimized IR templates that specify how to efficiently execute computer vision-type operators may be used to define more efficient processes for the ML model.

For example, object detection models are popularly used in applications at the edge. These models extend from CNN-based image classification models by adding a number of post-classification, vision-specific operators. These operators are normally used to propose regions of interest and sort them accordingly. Although vision-specific operators do not require much computation, these operators are traditionally demanding to optimize on integrated GPUs for performance concerns as these operators usually involve non-straightforward control logic which requires the threads within a compute unit of a GPU to diverge if not handled carefully. As a result, it is practically difficult to run object detection models, such as SSD and Yolo, entirely on integrated GPUs, which is evident in current solutions that can at best run these with significantly sub-optimal performance characteristics. Accordingly, embodiments optimize the vision-specific operators that essentially cause the lack of support of CNN models on integrated GPUs.

For example, sorting — and essentially, argsort — is a common operator in CNN models such as SSD. Essentially, argsort assigns the sorted index number to every item in a list. Although there are some argsort implementations for discrete GPUs in CUDA, the OpenCL counterpart for integrated GPUs of Intel and ARM is not yet available.

Achieving high performance sorting on GPUs is notoriously hard as it requires conditional branches that do not fit the parallel nature of GPUs. For example, the NMS operators frequently used in SSD models contain sorting operations to sort the small data blocks where each of them may vary in the input size. Thus, for each dimension of the input data, different numbers of elements need to be sorted. This process could cause branch divergence if not implemented properly. GPUs are not designed to run efficiently on small imbalanced problems that are substantially harmful to the performance.

Figure 3:
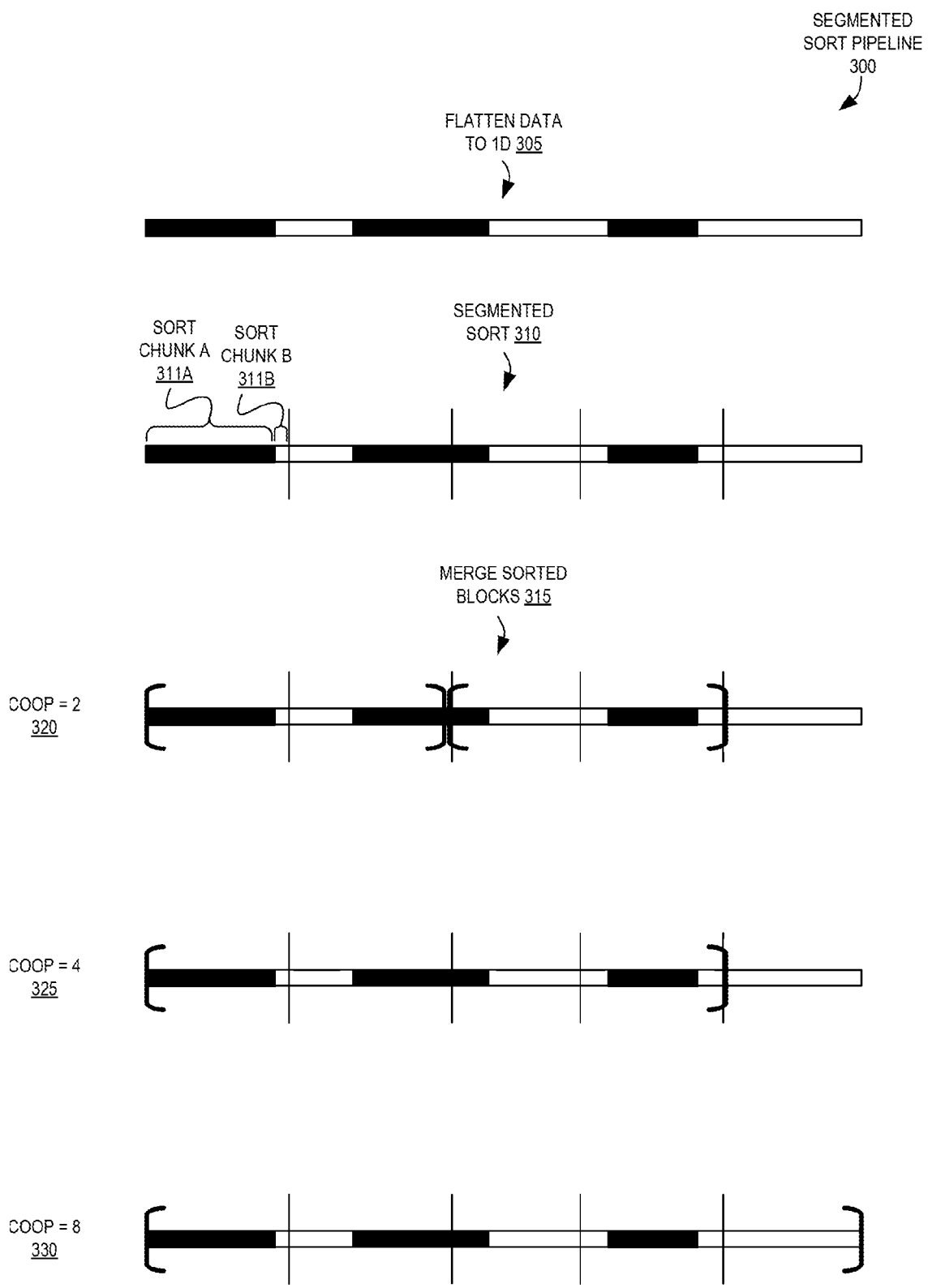
FIG. 3 is a diagram illustrating an optimized segmented sort pipeline according to some embodiments.

Embodiments disclosed herein can optimize argsort operators without these issues for execution by integrated GPUs. FIG. 3 is a diagram illustrating an optimized segmented sort pipeline 300 according to some embodiments.

As shown at 305, embodiments flatten the input array so that the fine-grained sorting problem at each dimension becomes coarse-grained. This, however, brings us two challenges as well, load balancing and programming simplicity. Embodiments thus use segmented sorting to optimize the argsort for CNN models.

The disclosed technique is as follows. With regard to FIG. 2, black and white bars represent different segments, where the length of the lines represents the size of a segment. The vertical lines represent an active interface.

First, at 305 the data set is flattened into a 1D array with the starting index of each segment stored, where ones (if not all) of the segments are of different size. Second, the flattened array is divided into equal length as shown at 310 with vertical bars. Thus, as shown, the flattened array is separated into equal-size blocks, and for ease of illustration, we assume that there are five thread cores in total, and each thread operates on one block.

Next, each block is sorted by a different processing element (e.g., thread) instead of having each processing element sort each individual variant-length segment. However, this sorting process respects the segmentation - as shown, a first processing element would sort a first chunk 311A and separately sort a second chunk 311B.

Finally, a series of merge operations is performed at block 315. Each iteration doubles the cooperative block size until all elements are sorted. In "coop 2" 320, two threads work cooperatively to merge two adjacent blocks. In "coop 4" 325, four threads work together to merge four blocks. And, in "coop 8" 330, all five blocks are merged by all thread cores working cooperatively. This procedure is efficient because only the segments that span the active interface between two input lists are modified during this phase.

Figure 4:
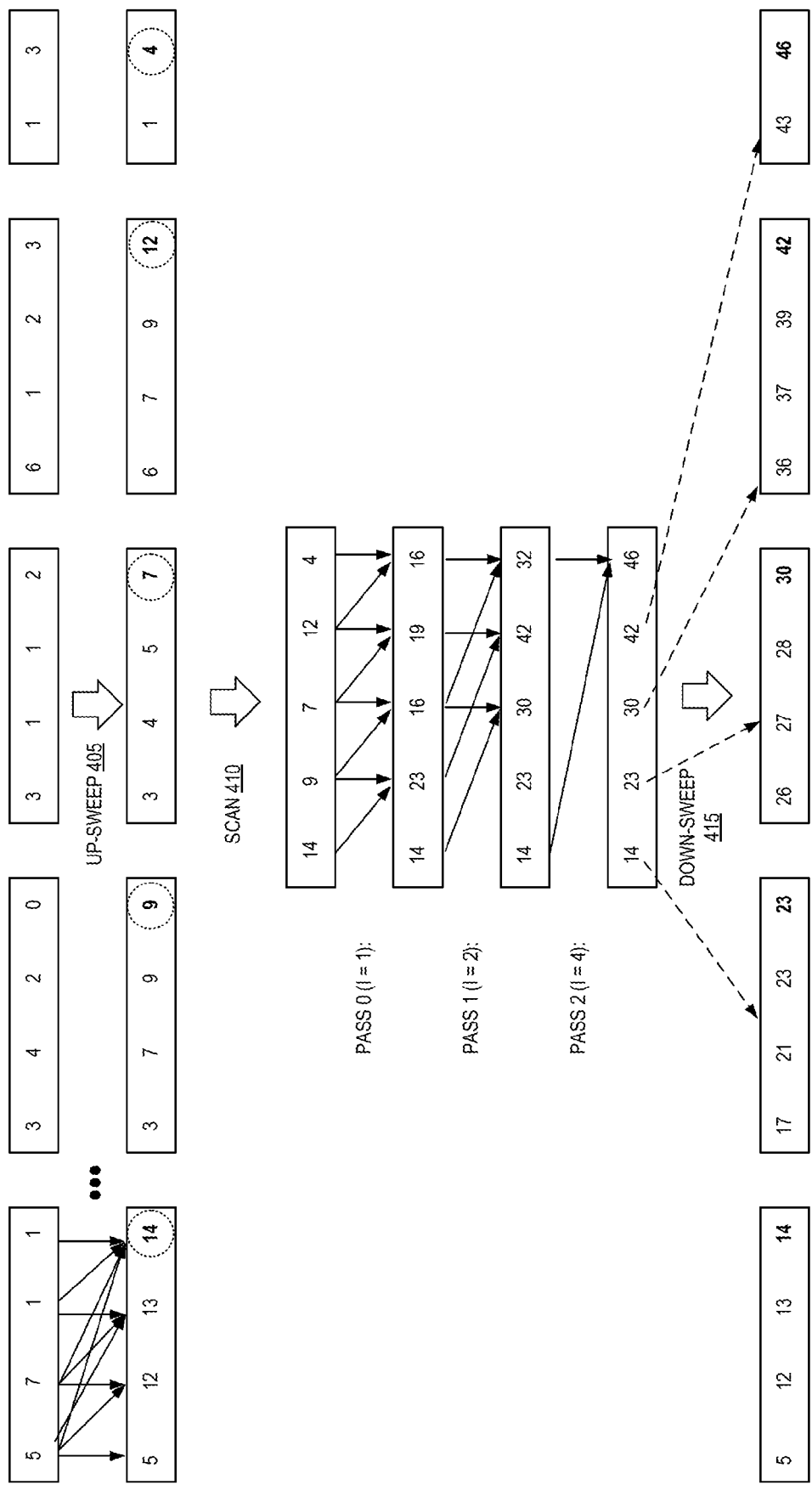
FIG. 4 is a diagram illustrating an optimized prefix sum pipeline according to some embodiments.

As another example, embodiments can optimize a prefix sum operator. FIG. 4 is a diagram illustrating an optimized prefix sum pipeline 400 according to some embodiments.

Prefix sum (scan) is a trivial sequential algorithm on the CPU. However, the GPU is not optimized for doing sequential computations, especially when work items have data dependence. Inspired by the classic parallel scan by Hillis and Steele, embodiments provide an efficient prefix sum for both CUDA and OpenCL-oriented integrated GPUs.

In some embodiments, the process utilizes a three-stage configuration: up-sweep 405, scan 410, and down-sweep 415. Given n input elements, log(n) passes are used to complete the scan in the cooperative scan of the Hillis and Steele method. In pass d, the element $i - 2^d$ is added to the element i. Though the algorithm has O(n log n) operations compared to O(n) for the CPU sequential algorithm, it reduces the latency from O(n) to O(log n).

However, the number of inputs is normally much larger than the number of cores in a device. Therefore, simply applying the previously mentioned method is inefficient as it may trigger global synchronization for each pass. Instead, embodiments leverage register blocking to avoid the need of global synchronization and reduce data movement. This register blocking technique assigns multiple elements to one processor which are processed sequentially. The reduction results from all cores are then processed with a parallel scan using Hillis and Steele's method without global synchronization. For example, in FIG. 3, we suppose there are five parallel processors and eighteen elements sitting in an array, and four elements are assigned to each processor except the last one, which is assigned two elements. For the up-sweep step 405, a scan computation is done sequentially inside each processor and parallel across all processors - here, the first four elements are changed from 5,7,1,1 to 5,12,13,14 where, for the resultant set, 5=5, 12=5+7, 13+5+7+1, and 14=5+7+1+1.

After getting segmented reduction results for each processor (numbers using bold font and surrounded by dotted circles), a parallel scan 410 is performed across all processors as shown using multiple passes 0-2. For the down-sweep 415 step, the scanned results are added back to the corresponding processors in parallel as shown with dashed lines - e.g., the value "14" as added to the values 3,7,9,9 to result in 17,21,23,23.

Embodiments can further implement GPU-optimized procedures for other vision-specific operators. There are some other vision-specific operators, such as box_nms, ROIA-liJn, MultiboxDetection, etc., that can be implemented in a similar manner, allowing a full suite of computer-vision operators to be optimized via use of IR to produce fast GPU code with relatively light engineering effort, allowing for the generation of efficient code for both CUDA and OpenCL supported platforms.

However, even if all vision-specific operators for targeted models on integrated GPUs cannot be performed, or for new vision-specific operators introduced in the future, embodiments can "fall back" these operators to be executed by CPUs.

While integrated GPUs have shown their effectiveness in producing competitive performance with reasonable power budget, there are some circumstances that we may not be able to fully execute a whole model on integrated GPUs. First, GPUs generally offer less flexibility and programmability than their accompanying CPUs. Hence, some vision-specific operators, e.g., sorting, that require intensive control logic are intrinsically more difficult to implement on GPUs than on CPUs. As discussed herein, it may require some engineering efforts to write the GPU versions of these operators for each GPU vendor and tune the performance for them. A more effective alternative is to fall back these operators to CPUs for much simpler and more unified implementation but leave the other computationally intensive parts running on GPUs. It is a reasonable design due to the following three reasons.

First, some of these types of operators typically do not require much computation and hence do not require massive parallelism to exploit. Second, these operators are usually found in the pre/post-processing section of a neural network which is not the performance-critical part, so executing them on CPUs does not bring much performance penalty. Third, in practice, the amount of data transmission required to fall back is not large due to the above reasons and there is not much back-and-forth data movement/copy across GPU and CPU devices. In addition, the wide use of shared memory has facilitated the data transferring between GPU and CPU on the same SoC.

It may seem that a sophisticated algorithm is required to intelligently place the right operator on the right device. However, embodiments use a simple heuristic for CNN models while attempting to schedule as many operators on the integrated GPUs, only leaving a few GPU-unfriendly ones to the CPU. This heuristic in some embodiments is implemented using a standard graph traversal technique in a two-pass manner (of the optimized graph) with a list of known operators that are performant on GPUs. In the first pass, a device property of a graph node is marked as being "GPU" if that operator is found within the list; otherwise, the node's device property is labeled as "CPU." On the completion of the first pass, the second pass is carried out to insert a data copy operator between any two directly connected nodes assigned to different devices (e.g., one node is GPU and a next node is CPU) to move the data from the GPU to the CPU and vice versa. Notably, this process only causes negligible performance degradation, but beneficially enables the early adoption of new models with new operators.

Turning back to FIG. 2, the set of operator-level and graph-level optimizations 220 also includes performance tuning including tensor-level tuning 230 and/or graph-level tuning 235.

Embodiments tune the performance at different levels of the representations — tensor-level and graph-level — of a given CNN model. Graph-level optimization has great impact on CNN model performance. Besides general graph-level optimizations known to those of skill in the art, including operator fusion, pre-computing, simplifying inference for batch-norm and dropout, embodiments also apply a graph tuner technique (see, e.g., *Optimizing CNN model inference on CPUs* by Yizhi Liu, Yao Wang, Ruofei Yu, Mu Li, Vin Sharma, and Yida Wang; arXiv:1809.02697v2 [cs.DC], 11 Jan. 2019) to fine-tune the data layout to achieve better end-to-end performance. Because optimizing convolution kernels requires transforming input and output to different data layouts that might bring extra overhead, the graph tuner uses dynamic programming to examine the trade-off between optimized kernels and data layout transformation overheads. By applying all these graph-level optimization strategies, embodiments get the graph-level optimal schedule for each convolution kernel.

Regarding tensor-level tuning, CNN operators normally act on top of tensors (e.g., n-dimensional arrays). Hand-written schedule/optimization libraries, e.g., cuDNN, MKL-DNN, etc, from hardware vendors have been widely used to deliver compelling performance. However, each vendor may provide their own proprietary library with optimized performance on a certain number of kernels. That is, programmers may have to sort out the best combination of various kernel implementations, which also requires significant engineering efforts and domain knowledge of each kernel from each vendor. An optimization engine of an existing deep learning compiler stack (e.g., the AutoTVM feature of the TVM compiler stack) provides a venue that automatically optimizes common tensor operators for given hardware platform and builds up an optimization space composing possible transformed versions of tensors. Both hardware and software related factors are considered when constructing a low-level transformed program. For example, the typical ones are unrolling factor, thread binding, and vectorization capabilities, etc. Users may then provide limited parameters (via templates) to explore the search space based on statistical cost models for predicting achievable performance results. In some embodiments, such a tool (e.g., AutoTVM) is utilized to search for scheduling schemes that lead to good performance of convolutions based on the templates (e.g., code or definitions including parameters that can be modified) constructed for computer vision operators disclosed herein. As tensor-level search is costly — particularly at the edge devices due to their limited compute capability — embodiments can prevent replicated searching by maintaining a database to store the results for every convolution workload on each hardware platform.

At this point, an optimized main template 240 is created that, in an intermediate representation serving as an execution plan, can be translated/complied by a code generator 245 to generate one or multiple types of code for one or multiple hardware platforms - e.g., a compiled model variant A 250 (e.g., for CUDA) and/or compiled model variant B 255 (e.g., for OpenCL). As indicated with regard to FIG. 1, these model(s) can be stored at a storage location, transmitted to another system, deployed to edge devices, etc.

Figure 5:
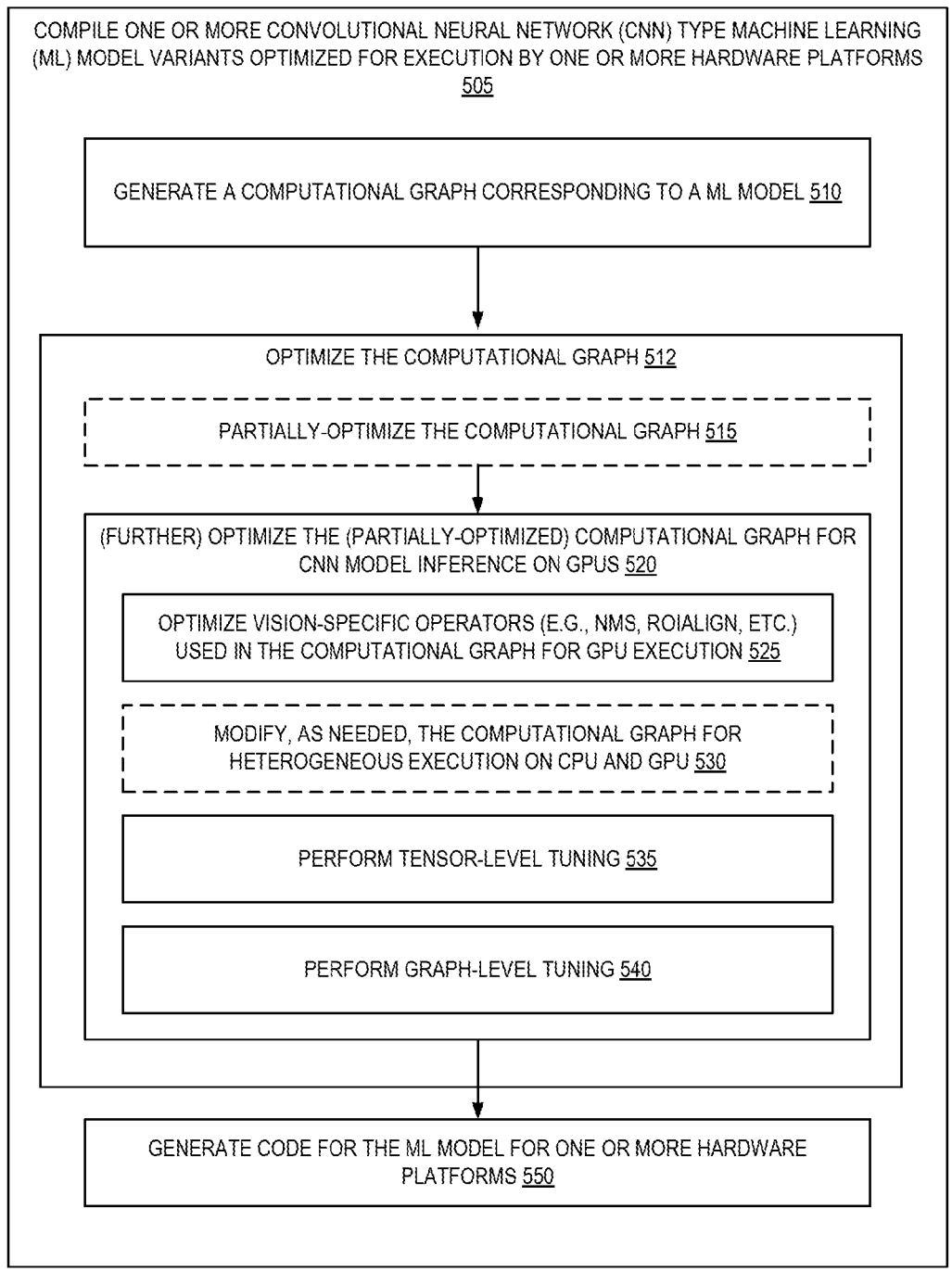
FIG. 5 is a flow diagram illustrating operations of a method for optimizing convolutional neural network models for inference using integrated graphics processing units according to some embodiments.

FIG. 5 is a flow diagram illustrating operations 500 of a method for optimizing convolutional neural network models for inference using integrated graphics processing units according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the model compilation system 132 of the other figures.

The operations 500 include, at block 505, compiling one or more convolutional neural network (CNN) type machine learning (ML) model variants optimized for execution by one or more hardware platforms.

The operations 500 include, at block 510, generating a computational graph corresponding to a ML model.

At block 512, the operations 500 further include, optimizing the computational graph. Block 512 optionally includes block 515 and partially optimizing the computational graph. For example, block 515 may include performing a set of one or more optimization techniques such as, but not limited to, performing operator fusion, tiling (e.g., separating a computation into small blocks for better data reuse), packing (e.g., performing a re-layout of the input matrices according to the tiling to enable more sequential memory access, which reduces cache miss rate), loop unrolling, vectorization, etc. At block 520, the operations include (further) optimizing the (partially optimized) computational graph for CNN model inference on GPUs, which includes one or more (or all) of optimizing vision-specific operators (e.g., NMS, ROIAlign, etc.) used in the computational graph for GPU execution at block 525, optionally modifying, as needed, the computational graph for heterogeneous execution on CPU and GPU at block 530 and performing tensor-level tuning at block 535 and graph-level tuning at block 540.

At block 550, the operations 500 further include, generating code for the ML model for one or more hardware platforms 550.

Figure 6:
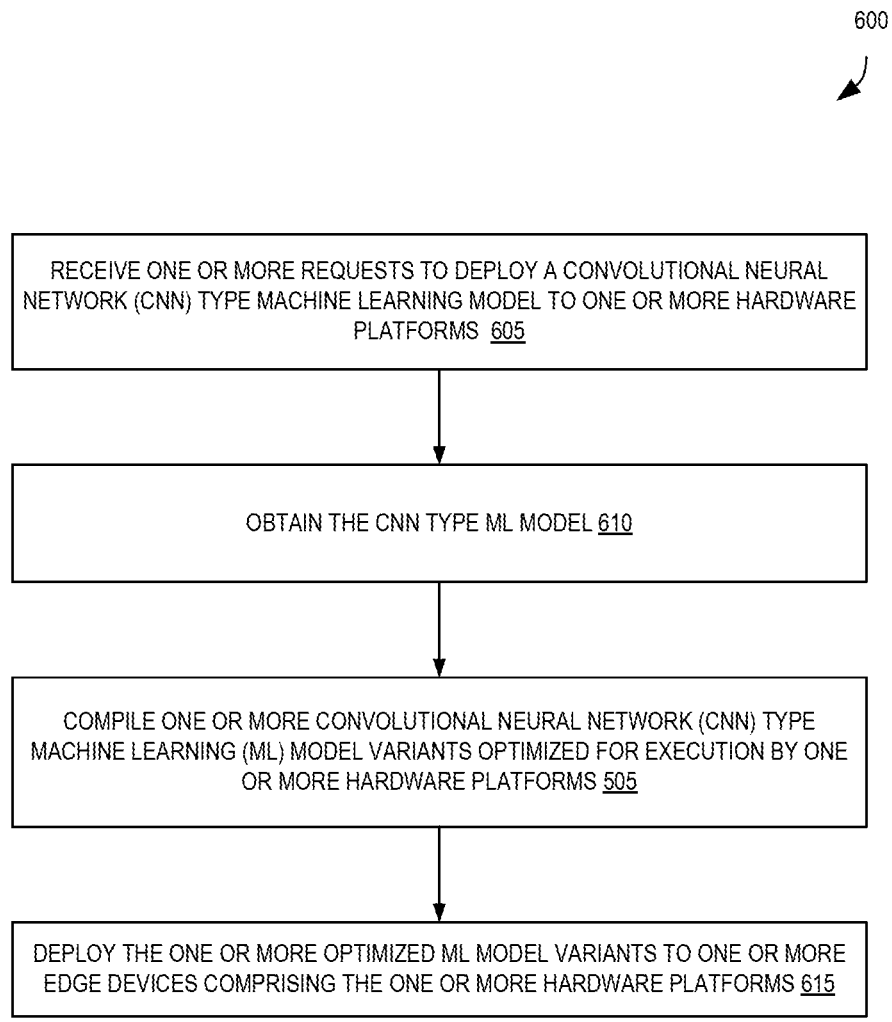
FIG. 6 is a flow diagram illustrating operations of a method for optimizing and deploying convolutional neural network models for inference using integrated graphics processing units according to some embodiments.

FIG. 6 is a flow diagram illustrating operations 600 of a method for optimizing and deploying convolutional neural network models for inference using integrated graphics processing units according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively by one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the model compilation system 132 of the other figures.

The operations 600 include, at block 605, receiving one or more requests to deploy a CNN type machine learning model to one or more hardware environments, and at block 610, obtaining the ML model.

The operations 600 further include, at block 505, compiling one or more CNN type ML model variants optimized for execution by one or more hardware platforms and at block 615, deploying the one or more optimized ML model variants to one or more edge devices comprising the one or more hardware platforms.

Figure 7:
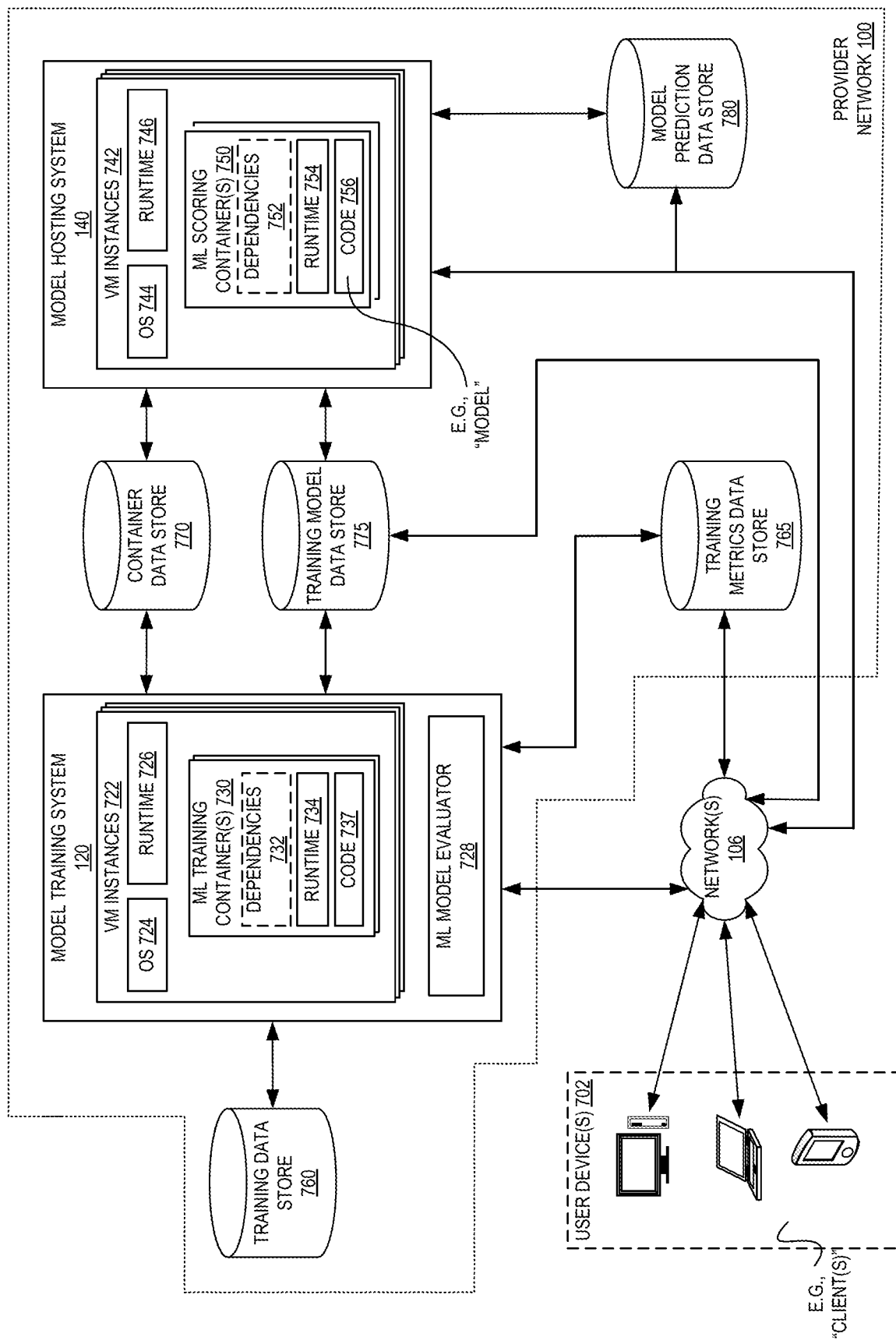
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s) 121, edge device(s) 110), a model training system 120, a model hosting system 140, a training data store 760, a training metrics data store 765, a container data store 770, a training model data store 775, and a model prediction data store 780.

A machine learning service 130 described herein may include one or more of these entities, such as the model hosting system 140, model training system 120, and so forth.

In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 120 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided — perhaps as part of a training request (or referenced in a training request) — to the model training system 120, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programing interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
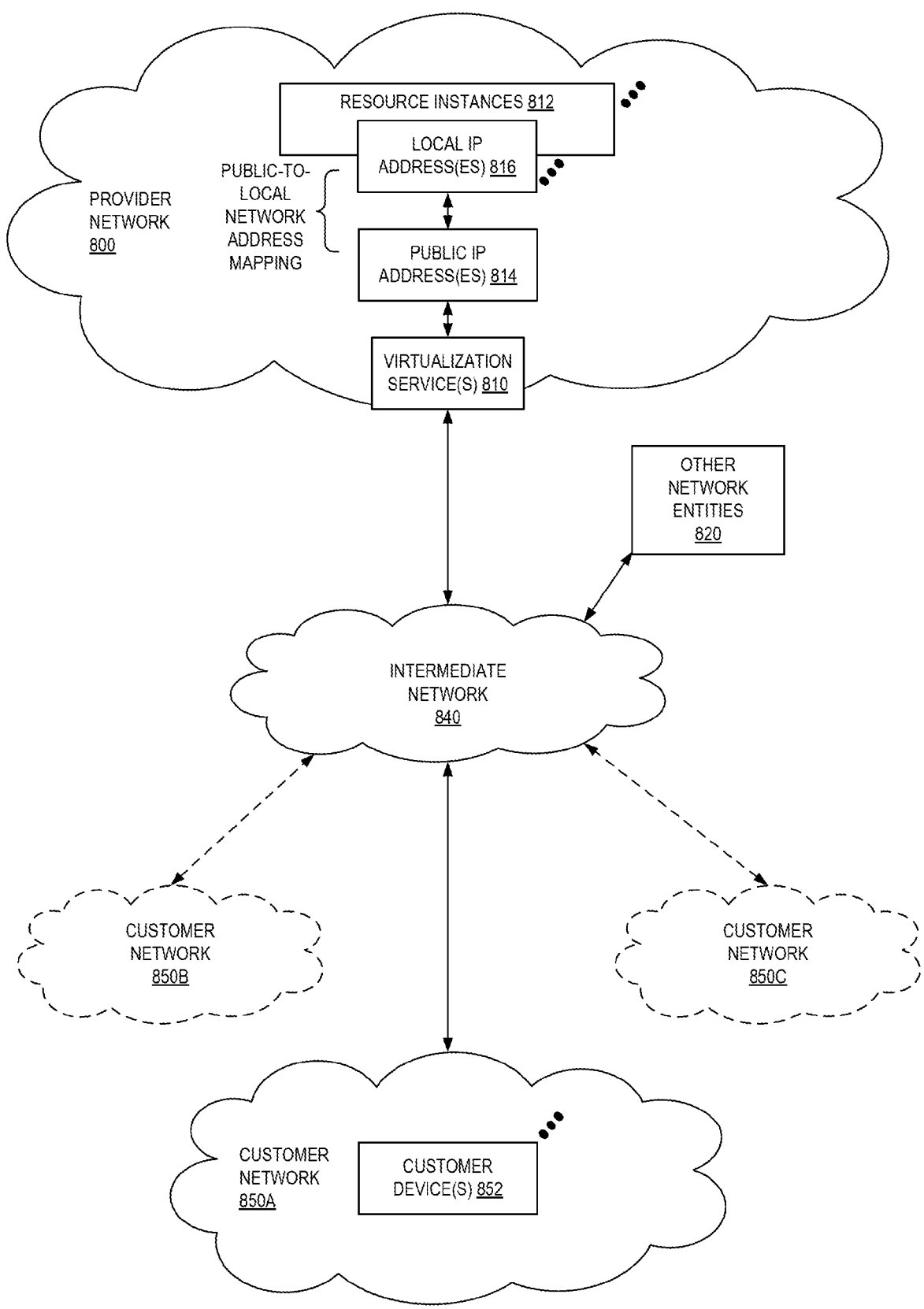
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider network 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
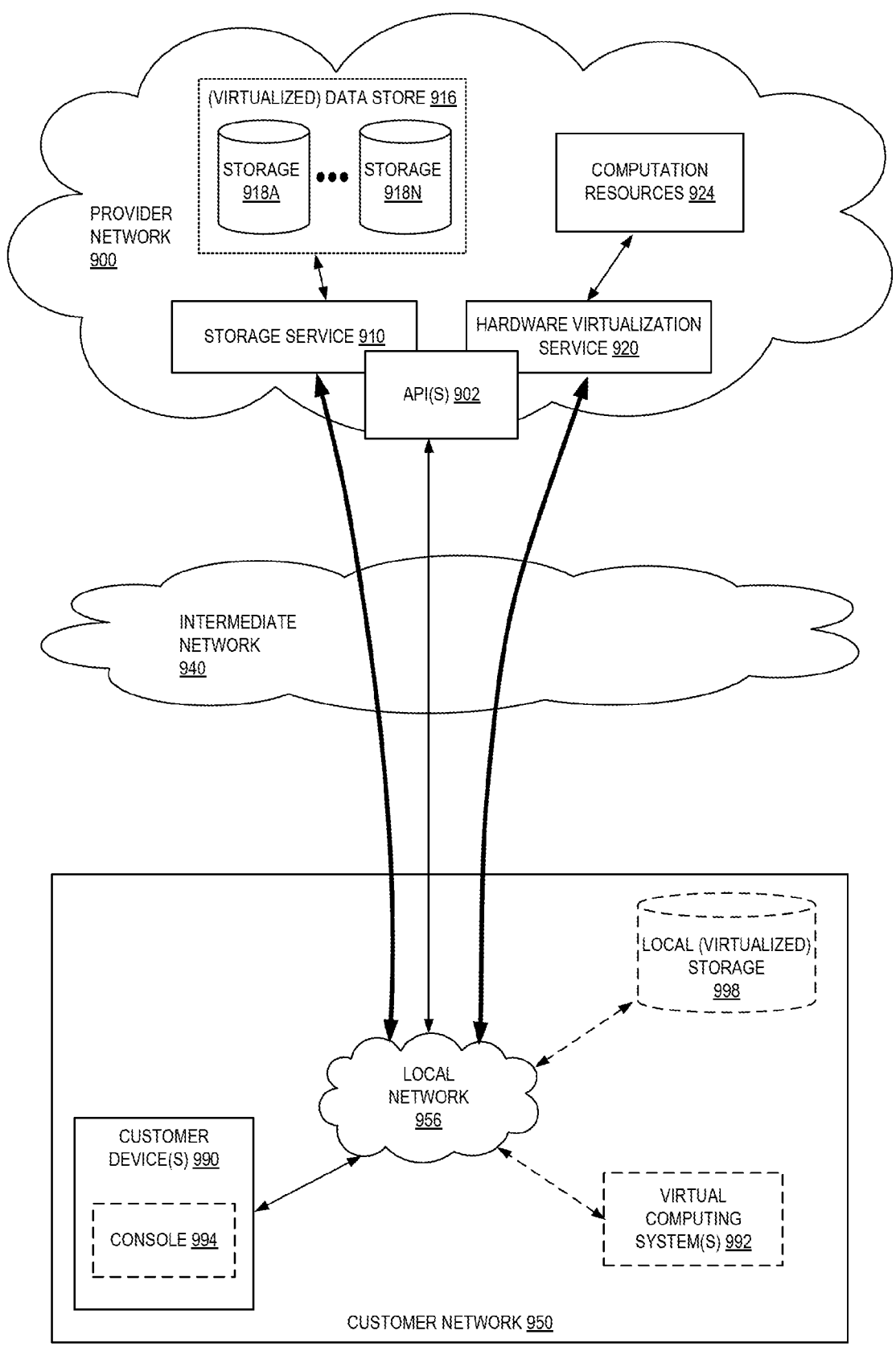
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative system

Figure 10:
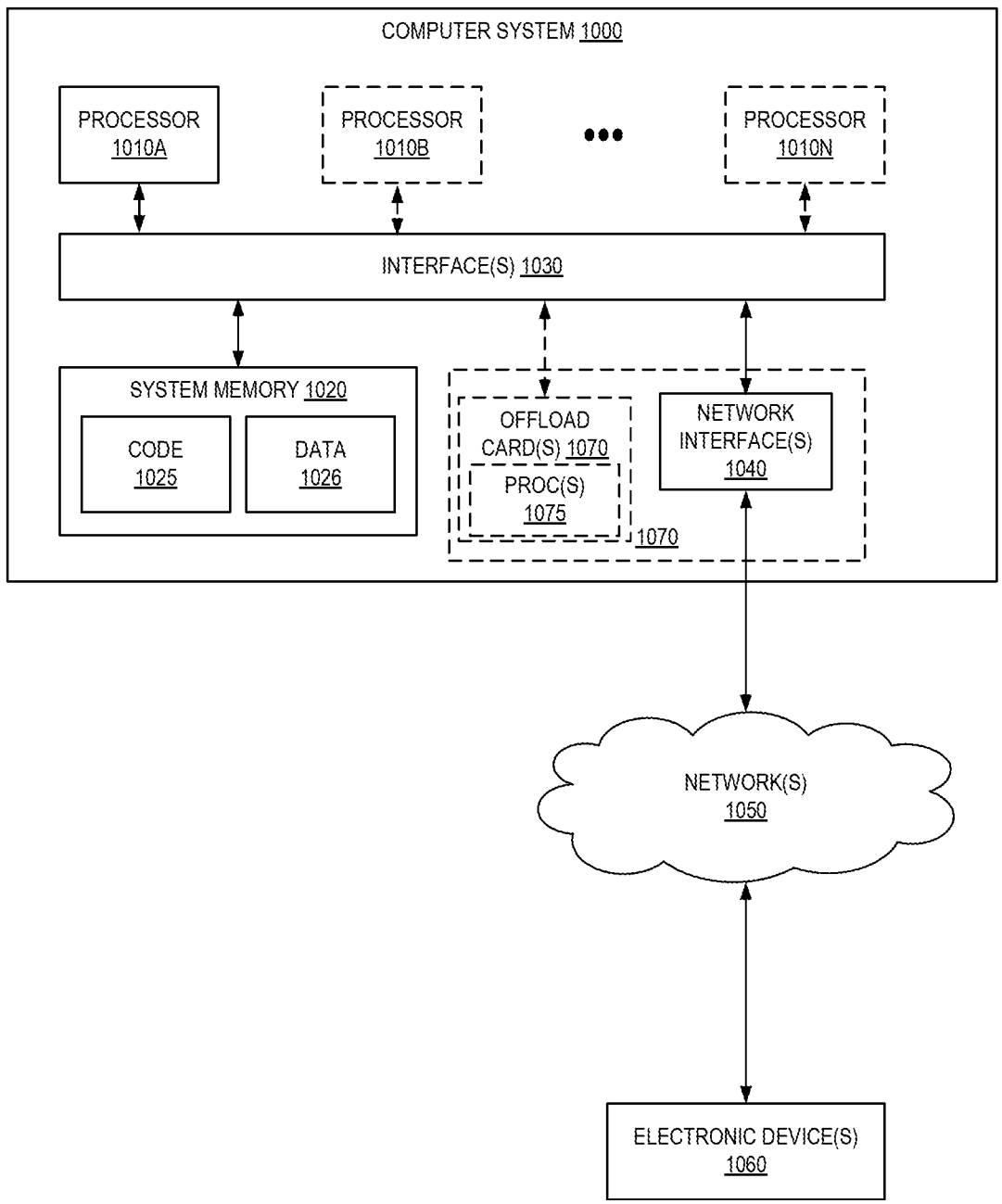
FIG. 10 is a block diagram illustrating an example computer system that may be used in some embodiments.

In some embodiments, a system that implements a portion or all of the techniques for described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect - Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining a convolutional neural network (CNN) type machine learning (ML) model;
    generating a computational graph for the ML model, the computational graph including one or more nodes corresponding to one or more operators utilized by the ML model;
    optimizing the computational graph to yield an optimized main template, the optimizing including selecting, for one node of the one or more nodes, a template corresponding to a computer vision operator that is optimized for execution using a graphics processing unit (GPU),
    wherein the computer vision operator is or includes an argsort operator, wherein the template indicates a procedure to sort of a set of data, the procedure including:
        flattening the set of data into a one-dimensional array, wherein the set of data is divided into a plurality of segments, wherein at least a first segment of the plurality of segments is of a different size than a second segment of the plurality of segments,
        sorting a plurality of blocks of the array using a plurality of processing resources, wherein at least two of the plurality of blocks are of a common size, and wherein the sorting does not cross a plurality of segment identifiers corresponding to the plurality of segments, and performing a series of one or more merge operations, comprising iteratively doubling a cooperative block size in each iteration; and generating code corresponding to the ML model based at least in part on the optimized main template for execution, wherein the code is specific to a hardware platform, wherein generating the code comprises generating code, based on the optimized main template, for a software platform that is associated with the hardware platform.

2. The computer-implemented method of claim 1, wherein the computer vision operator is or includes a prefix sum operator.

3. The computer-implemented method of claim 2, wherein the template indicates a procedure to perform a prefix sum of a set of data, the procedure including:

an up-sweep phase comprising performing scan operations by a plurality of processing resources on a corresponding plurality of data elements at least partially in parallel to obtain a plurality of segmented reduction results;

a scan phase including performing a parallel scan across the plurality of processing resources; and a down-sweep phase including adding data values generated during the scan phase to ones of the plurality of data elements at least partially in parallel.

4. The computer-implemented method of claim 1, wherein the one or more nodes comprise a plurality of nodes, and wherein optimizing the computational graph comprises:

performing a first pass through the computational graph to mark ones of the plurality of nodes to be scheduled for execution by the GPU and other ones of the plurality of nodes to be scheduled for execution by a central processing unit (CPU); and performing a second pass through the computational graph, wherein the second pass includes:

identifying, within the computational graph, a first node that is scheduled for execution by the GPU that is directly connected to a second node that is scheduled for execution by the CPU, and inserting, into the computational graph, a data copy operator between the first node and the second node.

5. The computer-implemented method of claim 4, wherein performing the first pass comprises:

determining, for each of the plurality of nodes, whether an identifier of the operator corresponding to the node exists within a data structure including operator identifiers known to be optimized for the GPU.

6. The computer-implemented method of claim 1, further comprising:

receiving, at an interface of a multi-tenant provider network, a request to deploy the ML model to one or more edge computing devices utilizing the hardware platform, the request including an identifier of the hardware platform.

7. The computer-implemented method of claim 1, wherein optimizing the computational graph further comprises:

performing graph-level tuning; and performing tensor-level tuning.

8. The computer-implemented method of claim 1, further comprising:

generating additional code corresponding to the ML model based at least in part on the optimized main template for execution, wherein the additional code is specific to a different hardware platform.

9. The computer-implemented method of claim 1, wherein the ML model is an image classification model, an object detection model, or an image segmentation model.

10. A system comprising:

a storage service implemented by a first one or more electronic devices; and a machine learning service implemented by a second one or more electronic devices, the machine learning service including instructions that upon execution cause the machine learning service to:

obtain a convolutional neural network (CNN) type machine learning (ML) model stored by the storage service;

generate a computational graph for the ML model, the computational graph including one or more nodes corresponding to one or more operators utilized by the ML model;

optimize the computational graph to yield an optimized main template, the optimizing including selecting, for one node of the one or more nodes, a template corresponding to a computer vision operator that is optimized for execution using a graphics processing unit (GPU), wherein the computer vision operator is or includes an argsort operator, and wherein the template indicates a procedure to sort of a set of data, the procedure including:

flattening the set of data into a one-dimensional array, wherein the set of data is divided into a plurality of segments, wherein at least a first segment of the plurality of segments is of a different size than a second segment of the plurality of segments;

sorting a plurality of blocks of the array using a plurality of processing resources, wherein at least two of the plurality of blocks are of a common size, and wherein the sorting does not cross a plurality of segment identifiers corresponding to the plurality of segments; and performing a series of one or more merge operations, comprising iteratively doubling a cooperative block size in each iteration; and generate code corresponding to the ML model based at least in part on the optimized main template for execution, wherein the code is specific to a hardware platform, wherein the generation of the code comprises generating code, based on the optimized main template, for a software platform that is associated with the hardware platform.

11. The system of claim 10, wherein the computer vision operator is or includes a prefix sum operator.

12. The system of claim 10, wherein the template indicates a procedure to perform a prefix sum of a set of data, the procedure including:

an up-sweep phase comprising performing scan operations by a plurality of processing resources on a corresponding plurality of data elements at least partially in parallel to obtain a plurality of segmented reduction results;

a scan phase including performing a parallel scan across the plurality of processing resources; and a down-sweep phase including adding data values generated during the scan phase to ones of the plurality of data elements at least partially in parallel.

13. The system of claim 10, wherein to optimize the computational graph, the instructions upon execution cause the machine learning service to:

perform graph-level tuning; and perform tensor-level tuning.

14. The system of claim 10, wherein to optimize the computational graph, the instructions upon execution cause the machine learning service to:
perform graph-level tuning; and
perform tensor-level tuning.

15. A computer-implemented method comprising:
obtaining a convolutional neural network (CNN) type machine learning (ML) model;
generating a computational graph for the ML model, the computational graph including one or more nodes corresponding to one or more operators utilized by the ML model;
optimizing the computational graph to yield an optimized main template, the optimizing including selecting, for one node of the one or more nodes, a template corresponding to a computer vision operator that is optimized for execution using a graphics processing unit (GPU), wherein the computer vision operator is or includes a prefix sum operator, wherein the template indicates a procedure to perform a prefix sum of a set of data, the procedure including:
an up-sweep phase comprising performing scan operations by a plurality of processing resources on a corresponding plurality of data elements at least partially in parallel to obtain a plurality of segmented reduction results,
a scan phase including performing a parallel scan across the plurality of processing resources, and
a down-sweep phase including adding data values generated during the scan phase to ones of the plurality of data elements at least partially in parallel; and
generating code corresponding to the ML model based at least in part on the optimized main template for execution, wherein the code is specific to a hardware platform, wherein generating the code comprises generating code, based on the optimized main template, for a software platform that is associated with the hardware platform.

16. The computer-implemented method of claim 15, further comprising:
receiving, at an interface of a multi-tenant provider network, a request to deploy the ML model to one or more edge computing devices utilizing the hardware platform, the request including an identifier of the hardware platform.

17. The computer-implemented method of claim 15, wherein optimizing the computational graph further comprises:
performing graph-level tuning; and
performing tensor-level tuning.

18. The computer-implemented method of claim 15, wherein the ML model is an image classification model, an object detection model, or an image segmentation model.

19. A system comprising:
a storage service implemented by a first one or more electronic devices; and
a machine learning service implemented by a second one or more electronic devices, the machine learning service including instructions that upon execution cause the machine learning service to:
obtain a convolutional neural network (CNN) type machine learning (ML) model stored by the storage service;
generate a computational graph for the ML model, the computational graph including one or more nodes corresponding to one or more operators utilized by the ML model;
optimize the computational graph to yield an optimized main template, the optimizing including selecting, for one node of the one or more nodes, a template corresponding to a computer vision operator that is optimized for execution using a graphics processing unit (GPU),
wherein the computer vision operator is or includes a prefix sum operator, and wherein the template indicates a procedure to perform a prefix sum of a set of data, the procedure including:
an up-sweep phase comprising performing scan operations by a plurality of processing resources on a corresponding plurality of data elements at least partially in parallel to obtain a plurality of segmented reduction results,
a scan phase including performing a parallel scan across the plurality of processing resources, and
a down-sweep phase including adding data values generated during the scan phase to ones of the plurality of data elements at least partially in parallel; and
generate code corresponding to the ML model based at least in part on the optimized main template for execution, wherein the code is specific to a hardware platform,
wherein the generation of the code comprises generating code, based on the optimized main template, for a software platform that is associated with the hardware platform.

20. The system of claim 19, wherein the ML model is an image classification model, an object detection model, or an image segmentation model.

* * * * *